United States Patent [19]
Yu et al.

[11] Patent Number: 5,273,799
[45] Date of Patent: Dec. 28, 1993

[54] SHAPED-ALTERED SEAMED IMAGING FLEXIBLE MEMBER AND METHOD OF CONSTRUCTING A FLEXIBLE IMAGING SHEET

[75] Inventors: Robert C. U. Yu, Webster; Geoffrey M. T. Foley, Fairport, both of N.Y.

[73] Assignee: Xerox Corporation, Stamford, Conn.

[21] Appl. No.: 815,092

[22] Filed: Dec. 27, 1992

[51] Int. Cl.⁵ .............................................. B32B 1/04
[52] U.S. Cl. .................................... 428/57; 428/60; 428/192; 428/194; 428/213; 428/215; 101/463.1; 430/270; 430/300
[58] Field of Search ................. 428/59, 192, 194, 213, 428/215, 60; 355/212; 430/270, 300; 101/463.1

[56] References Cited

U.S. PATENT DOCUMENTS

| | | | |
|---|---|---|---|
| 3,459,610 | 8/1969 | Dijkers et al. | 156/73 |
| 3,488,240 | 12/1970 | Roberts | 156/73 |
| 3,493,448 | 2/1970 | Powell et al. | 156/73 |
| 3,508,989 | 4/1970 | Lawrence et al. | 156/154 |
| 3,717,539 | 2/1973 | Roberts | 156/498 |
| 3,874,968 | 4/1975 | Robinson | 156/154 |
| 3,939,033 | 2/1976 | Grgach et al. | 156/515 |
| 4,197,149 | 4/1980 | Freitag et al. | 156/154 |
| 4,410,575 | 10/1983 | Obayashi et al. | 428/57 |
| 4,430,146 | 2/1984 | Johnson | 156/502 |
| 4,521,457 | 6/1985 | Russell et al. | 427/286 |
| 4,532,166 | 7/1985 | Thomsen et al. | 428/57 |
| 4,568,588 | 2/1986 | Fujiki | 428/57 |
| 4,648,931 | 3/1987 | Johnston | 156/251 |
| 4,838,964 | 6/1989 | Thomsen et al. | 156/73.1 |
| 4,878,985 | 11/1989 | Thomsen et al. | 156/459 |
| 4,883,742 | 11/1989 | Wallbillich et al. | 430/275 |
| 4,937,117 | 6/1990 | Yu | 428/57 |
| 4,943,508 | 7/1990 | Yu | 430/129 |
| 4,959,109 | 9/1990 | Swain et al. | 156/73.4 |
| 4,968,369 | 11/1990 | Darcy et al. | 156/217 |
| 5,021,109 | 6/1991 | Petropoulos et al. | 156/137 |
| 5,085,719 | 2/1992 | Eck | 156/73.4 |

OTHER PUBLICATIONS

Co-pending Application Ser. No. 07/634/365. Swain et al., "Process for Coating Belt Seams", Filed: Dec. 27, 1990.

*Primary Examiner*—Ellis P. Robinson
*Assistant Examiner*—Nasser Ahmad
*Attorney, Agent, or Firm*—Gary G. Heffernan; Zosan S. Soong

[57] ABSTRACT

A seamed flexible imaging member and a method of constructing a flexible imaging sheet is disclosed. The method of constructing a flexible imaging sheet comprises the steps of overlapping and forming. In the step of overlapping, a first marginal end region and a second marginal end region of the sheet are overlapped. In the forming step, a substantially planar surface is formed, extending in a direction transverse to the sheet with one end of the planar surface being integral with the sheet adjacent one end of the sheet and the other end of the planar surface being integral with the sheet adjacent the other end of the sheet, for securing the first marginal end region and the second marginal end region to one another by a seam. The seamed flexible imaging member comprises a sheet having a first marginal end region and a second marginal end region. The first marginal end region and the second marginal end region of the sheet are secured to one another by a material which may include a portion of the sheet, a separate securing material or both. The material defines a planar surface extending in a direction transverse to the sheet with one end of the planar surface being integral with the sheet adjacent one end of the sheet and the other end of the planar surface being integral with the sheet adjacent the other end of the sheet. The planar surface minimizes stress on the sheet, particularly stress caused by the flexible imaging member bending over small diameter rollers of a belt module within an electrophotographic imaging apparatus.

10 Claims, 7 Drawing Sheets

SHAPED-ALTERED SEAMED IMAGING FLEXIBLE MEMBER AND METHOD OF CONSTRUCTING A FLEXIBLE IMAGING SHEET

BACKGROUND OF THE INVENTION

1. Statement of Related Cases

The present application is related to the companion applications filed on the same date herewith and commonly assigned: U.S. patent application Ser. No. 07/815,310 entitled "A Scribed Seamed Imaging Flexible Member and Method of Constructing a Flexible Imaging Sheet"; and U.S. patent application Ser. No. 07/815,086 entitled "A Seamed Imaging Flexible Member Having Generally Undetectable Seam Defects and Method of Constructing a Flexible Imaging Sheet".

2. Field of the Invention

This invention relates generally to a flexible member for use within an electrophotographic machine, and more specifically, the present invention is directed to an improved shaped-altered seamed imaging flexible member and method for constructing a flexible imaging sheet.

3. Description of the Prior Art

The basic xerographic process comprises exposing a charged imaging photoconductive member, typically a flexible member or a nonflexible drum, to a light image of an original document. The irradiated areas of the photoconductive surface are discharged to record thereon an electrostatic latent image corresponding to the original document. A development system, thereupon, moves a developer mix of carrier granules and toner particles into contact with the photoconductive surface. The toner particles are attracted electrostatically from the carrier granules to the latent image forming a toner powder image thereon. Thereafter, the toner powder image is transferred to a sheet of support material. The sheet of support material then advances to a fuser which permanently affixes the toner powder image thereto.

There exists a wide variety of flexible members which can be utilized within an electrophotographic machine that utilizes the basic xerographic process. Of these, the most prominent in importance is the electrophotographic imaging member. The methods for constructing a flexible sheet and problems encountered therewith that are described hereinafter pertain in particular to an imaging member, and more specifically, a photoconductive member. However, a wide variety of flexible members exist, for example, intermediate transfer members, ionographic members, dielectric members, and other members which include a wide variety of coating or special application layers. The following discussion pertaining to an imaging member applies equally to the above-mentioned members as with respect to the problems encountered with the construction and utilization thereof.

An electrophotographic imaging flexible member may be provided in a number of forms. For example, the imaging member may be a homogeneous layer of a single material, such as vitreous selenium, or it may be a composite layer containing a photoconductor and another material. One type of composite imaging member comprises a layer of finely divided particles of a photoconductive inorganic resin binder. The photogenerating layer is capable of photogenerating holes and injecting the photogenerated holes into the charge transport layer.

As more advanced, higher speed electrophotographic copiers, duplicators and printers were developed, degradation of image quality was encountered during extended cycling. Moreover, complex, highly sophisticated duplicating and printing systems operating at very high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. One type of multilayered photoreceptor that has been employed as a belt in electrophotographic imaging systems comprises a substrate, a conductive layer, a blocking layer, an adhesive layer, a charge generating layer, a charge transport layer, and a conductive ground strip layer adjacent to one edge of the imaging layers. This photoreceptor may also comprise additional layers, such as an anti-curl back coating layer and an optional over-coating layer.

The electrophotographic imaging flexible member may be fabricated from a sheet cut from a web. The sheets are generally rectangular in shape. All sides may be of the same length, or one pair of parallel sides may be longer than the other pair of parallel sides. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing and the like. Ultrasonic welding is generally the preferred method of joining because of its speed, cleanliness (no solvents) and production of a thin and narrow seam. In addition, ultrasonic welding is preferred because it causes the generation of heat at the contiguous overlapping marginal end regions of the sheet to maximize melting of one or more layers therein.

When ultrasonically welded into a belt, seams in some multilayered imaging flexible members can delaminate during fabrication when larger webs are slit into smaller belt size sheets. Further, after the sheets are welded into belts, the belts tend to delaminate during extended cycling over small diameter support rollers or when subjected to lateral forces caused by rubbing contact with stationary web edge guides of a belt module during cycling. Seam delamination is further aggravated when the belt is employed in electrophotographic imaging systems utilizing blade cleaning devices. In addition, belt delamination is encountered during the web slitting operations fabricating belt photoreceptors from wide webs. Alteration of the materials in the various belt layers, such as the conductive layer, hole blocking layer, adhesive layer, charge generating layer and/or charge transport layer to reduce delamination is not easily accomplished. The alteration of the materials may adversely affect the overall electrical, mechanical and other properties of the belt, such as residual voltage, background, dark decay, flexibility and the like.

For instance, the imaging flexible member in an electrophotographic machine can be a photoreceptor belt fabricated by the lap-joined ultrasonic welding of the opposite ends thereof. In the ultrasonic seam welding process, ultrasonic energy transmitted to the overlap region is used to melt the sheets of photoconductive, substrate and/or coating materials into a seam. The ultrasonic welded seams of multilayered photoreceptor belts are relatively brittle and low in strength and toughness. The joining techniques, particularly the welding process, can result in the formation of a flashing or splashing that projects beyond the sides and the edges of the seam in the overlap region of the photoreceptor belt. As a result of the splashing, the imaging flexible member is about 1.6 times thicker in the seam region than that of the remainder thereof (in a typical example, 188 microns vs. 116 microns).

The photoreceptor belt in an electrophotographic imaging apparatus undergoes strain as the belt is cycled therethrough over a plurality of rollers therein. The excessive thickness of the photoreceptor belt in the seam region due to the presence of the splashing results in a large induced bending strain as the seam goes over each roller. Generally, small diameter support rollers, highly desirable for simple, reliable copy paper stripping systems, are used in the electrophotographic imaging apparatuses having a photoreceptor belt system operating in a very confined space. Unfortunately, the small diameter rollers, e.g., less than about 0.75 inches (19 millimeters) in diameter, raise the threshold of the mechanical performance criteria to such a high level that the photoreceptor belt seam failure can become unacceptable for the multilayered belt photoreceptors. For example, when bending over a 19 millimeter roller, a XEROX® standard Active Matrix Material belt seam splashing may develop a 0.96% tensile strain due to bending. This compares with a 0.59% induced bending strain which may develop within the rest of the photoreceptor belt. The 0.96% tensile strain in the seam splashing region of the belt, thus represents a 63% increase in stress placed upon the seam splashing region of the belt.

Under dynamic fatiguing conditions, the seam provides a focal point for stress concentration and becomes the initial point of failure in the mechanical integrity of the belt. The splashing, thus tends to shorten the life of the seam and, thereby, the life of the flexible member in copiers, duplicators, and printers. There is a need for improving the flexible members to have a seam which can withstand greater fatiguing conditions.

The following disclosures may be relevant to various aspects of the present invention:

U.S. Pat. No. 3,493,448
Patentee: Powell et al.
Issued: Feb. 3, 1970

U.S. Pat. No. 4,410,575
Patentee: Obayashi et al.
Issued: Oct. 18, 1983

U.S. Pat. No. 4,430,146
Patentee: E. Johnson
Issued: Feb. 7, 1984

U.S. Pat. No. 4,521,457
Patentee: Russell et al.
Issued: Jun. 4, 1985

U.S. Pat. No. 4,532,166
Patentee: Thomsen et al.
Issued: Jul. 30, 1985

U.S. Pat. No. 4,648,931
Patentee: O. Johnston
Issued: Mar. 10, 1987

U.S. Pat. No. 4,838,964
Patentee: Thomsen et al.
Issued: Jun. 13, 1989

U.S. Pat. No. 4,878,985
Patentee: Thomsen et al.
Issued: Nov. 7, 1989

U.S. Pat. No. 4,883,742
Patentee: Wallbillich et al.
Issued: Nov. 28, 1989

U.S. Pat. No. 4,937,117
Patentee: Yu
Issued: Jun. 26, 1990

U.S. Pat. No. 4,943,508
Patentee: Yu
Issued: Jul. 24, 1990

U.S. Pat. No. 4,959,109
Patentee: Swain et al.
Issued: Sep. 25, 1990

U.S. Pat. No. 4,968,369
Patentee: Darcy et al.
Issued: Nov. 6, 1990

U.S. Pat. No. 5,021,109
Patentee: Petropoulous et al.
Issued: Jun. 4, 1991

Co-pending U.S. patent application Ser. No. 07/634,365
Applicant: Swain et al.
Filed: Dec. 27, 1990

The relevant portions of the foregoing disclosures may be briefly summarized as follows:

U.S. Pat. No. 4,521,457 and U.S. Pat. No. 4,943,508 each disclose a process and apparatus for applying, to a surface of a support member, at least one ribbon-like stream of a first coating composition adjacent to and in edge contact with at least one second ribbon-like stream of a second coating composition to form a unitary layer on the surface of the support member. The introduction of coating into a reservoir chamber forms a generally wedge shaped spacing member.

U.S. Pat. No. 4,883,742 discloses a joining of an end and/or lateral areas of thermoplastically processible photosensitive layers. The end and/or lateral areas of photosensitive layers are overlapped to avoid bubbles and air cavities between the end and/or lateral areas. The overlapped area is then heated under pressure to firmly join the areas together. The joined photosensitive layer is then treated and smoothed to shape it to size.

U.S. Pat. No. 4,410,575 discloses a method of lap welding fabrics together by superposing two end portions of one or two fabrics on each other with an interposing bonding tape between the superposed two end portions. The method includes applying a high frequency wave treatment and/or heat treatment by pressing at least one of the superposed end portions to melt the interposed portion of the bonding tape in order to lap melt the fabrics to each other. At least one side edge portion of the tape extends outwardly over an edge of the end portion which is deformed from the forces absorbed when the heat treatment and frequency wave treatment are applied. The fabrics may be made of any fibers or natural fibers.

U.S. Pat. No. 3,493,448 discloses a method of splicing photographic film by an ultrasonic welding apparatus which includes steps comprising sandblasting the ends to be welded and chilling the fused ends to be fused together. The ends of the photographic film are overlapped and compressed together. Heat is introduced into the film ends for fusing together.

U.S. Pat. No. 4,968,369 discloses an apparatus and process for fabricating belts wherein the leading edge and the trailing edge are overlapped to form a lap joint. Welding of the belt results in flashings at each end of the welded lap joint. A punch cutter is utilized to remove weld flashing at each end of the welded belt lap joint.

U.S. Pat. No. 4,878,985 and U.S. Pat. No. 4,838,964 each disclose an apparatus and a process for fabricating belts wherein the leading edge and the trailing edge are overlapped to form a loop of a web segment loosely suspended from the joint formed thereby. The web is sheared to form a leading edge free of defects. An ultrasonic belt welding station comprising an ultrasonic horn and transducer assembly is utilized in the fabrication of the belt.

U.S. Pat. No. 4,937,117 discloses a flexible belt fabricated from a substantially rectangular sheet having a first edge joined to a second parallel edge to form a seam. Flashings at the ends of the welded seam of the belt are removed by means of a notching device capable of cutting the desired elongated shape.

U.S. Pat. No. 4,959,109 discloses a process and apparatus for fabricating a unitary belt comprising two rotatable mandrels and a wrapping station. A web is wrapped around each rotatable mandrel whereat the web is severed to form a trailing edge. A wrapping station overlaps a leading edge of the web to form a belt having a seam.

U.S. Pat. No. 4,532,166 discloses a welded web and a process for forming the web. The web may be formed by a process in which a web having a first edge is provided. At least one aperture is formed in at least the first edge. The first edge is then overlapped on an exposed surface of a second edge. Ultrasonic welding may be used to raise the temperature of at least the region of contiguous contact adjacent the aperture. Thermoplastic material from the second edge at least partially fills the aperture, thereby bonding the first edge to the second edge.

U.S. Pat. No. 4,648,931 discloses a method of forming a bead seal in a biaxially oriented polymer film by heat bonding. The method consists of pressing together web layers in a sealing zone, a selected segment of the pressed web being heated above the bonding temperature of the plastic while adjacent web segments are maintained below that temperature. The heated web segment has a relatively lower surface friction than the surfaces pressing the adjacent web segment. The layers of the heated segment of the web are physically unrestrained against shrinking during heating and are allowed to shrink back to their pre-oriented molecular configuration while the adjacent segment is restrained against movement. A hermetic bead seal is thus formed between the web layers.

U.S. Pat. No. 4,430,146 discloses a belt splicing method and apparatus. The apparatus comprises pairs of longitudinal bars on which are respectively mounted platen heating assemblies. One bar is centrally supported pivotally on a clamping arrangement and the other bar is removably connected with the clamping arrangement in a manner permitting pivotable disposition of the bars with their platens in opposed facing parallel relation at various spacings. The apparatus facilitates a new belt splicing method eliminating the conventional need to use supplementary liquid thermoplastic material to effect bonding of the belt ends. By this process, a new belt splice is provided with the spliced ends being fused together with their respective thermoplastic material.

U.S. Pat. No. 5,021,109 discloses a process for preparing a multilayered sheet to form a flexible belt. A tubular sleeve of polymeric material is heated to at least apparent glass transition temperature. The tubular sleeve is placed about a mandrel and treated with one or more layers. The sleeve is reheated, then removed from the mandrel. A seamless belt, having a predetermined inner circumference, is formed.

Co-pending U.S. patent application Ser. No. 07/634,365 discloses a process for coating belt seams with hardenable coatings containing film forming polymers. A smooth liquid coating comprises a hardenable film forming polymer on the welded seam. The coating, substantially free of fugitive solvent, is hardened to form a smooth solid coating on the seam.

SUMMARY OF THE INVENTION

In accordance with one aspect of the present invention, there is provided a flexible imaging member, comprising a sheet and securing means. The sheet has a first marginal end region and a second marginal end region. The securing means defines a substantially planar surface extending in a direction transverse to the sheet with one end of the planar surface being integral with the sheet adjacent one end of the sheet and the other end of the planar surface being integral with the sheet adjacent the other end of the sheet. The securing means secures the first marginal end region and the second marginal end region of the sheet to one another. The securing means minimizes stress on the sheet.

Pursuant to another aspect of the present invention, there is provided a method for constructing a flexible imaging sheet comprising the steps of overlapping and forming. In the step of overlapping, a first marginal end region and a second marginal end region of the sheet are overlapped. In the forming step, a substantially planar surface is formed. The planar surface extends in a direction transverse to the sheet with one end of the planar surface being integral with the sheet adjacent one end of the sheet and the other end of the planar surface being integral with the sheet adjacent the other end of the sheet. The planar surface secures the first marginal end region and the second marginal end region to one another.

Other features of the present invention will become apparent as the description thereof proceeds and upon reference to the drawings.

BRIEF DESCRIPTION OF THE DRAWINGS

In the detailed description of the preferred embodiments of the present invention, reference is made to the accompanying drawings, in which.

Figure 1:
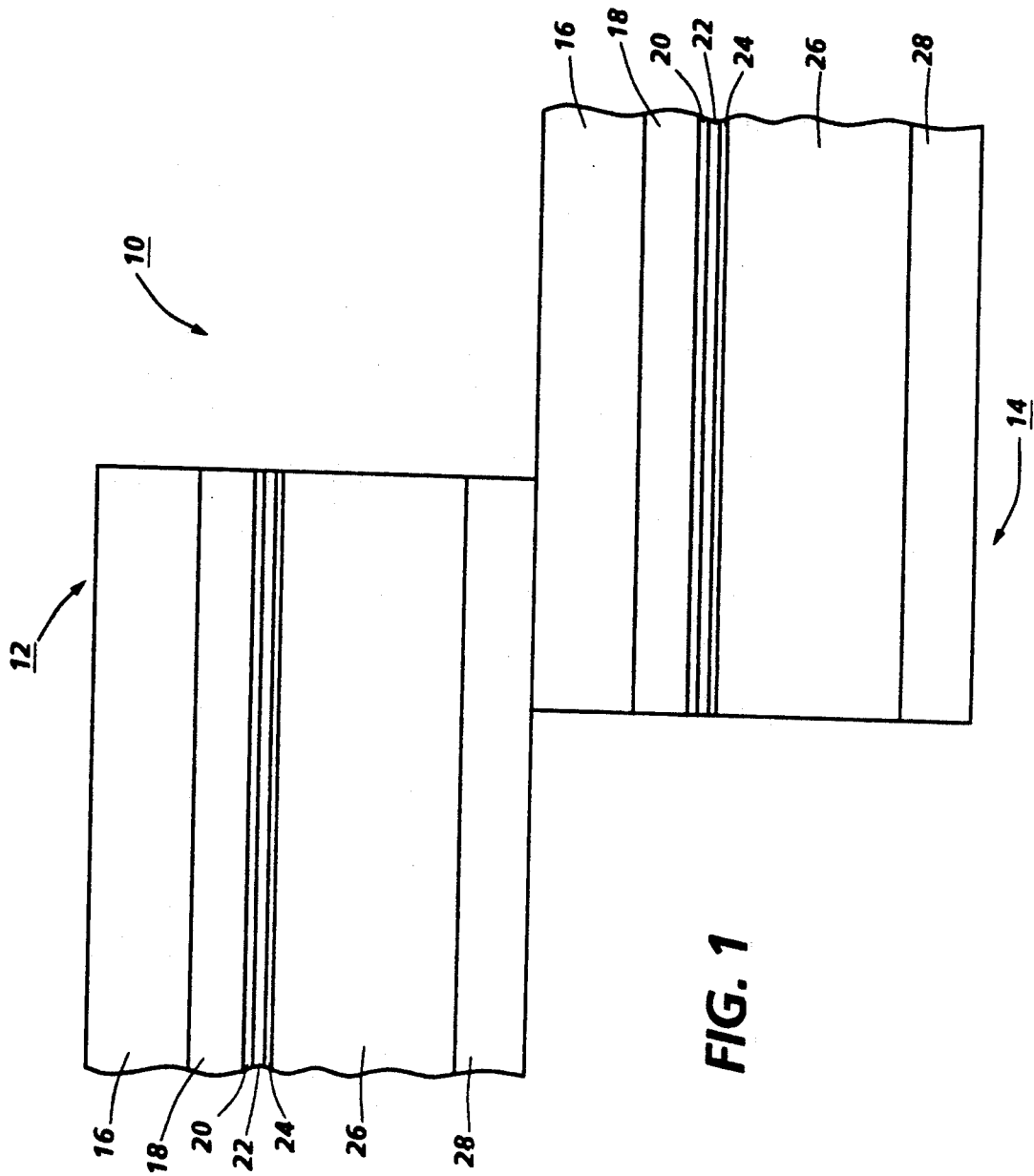
FIG. 1 is a cross-sectional view of a multiple layered flexible member in the form of a sheet of photoconductive imaging material.

In the drawings and the following description, it is to be understood that like numeric designations refer to components of like function.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

Referring to FIG. 1, there is illustrated a flexible member 10 in the form of a sheet having a first marginal end region 12 overlapping a second marginal end region 14 to form an overlap region. The flexible member 10 can be utilized within an electrophotographic imaging apparatus and may be a single film substrate member or a member having a film substrate layer combined with one or more additional layers. Such layers may be in the form a film forming binder. The layers may comprise imaging material, ionographic material, or dielectric material. Additionally, a wide variety of coating or special application material may be applied to the surface(s) of one or more of the layers of the flexible member 10. Thus, the flexible member may take the form of an imaging member, intermediate transfer member (a toner transfer member), ionographic member, dielectric member, or other members which include a wide variety of coating or special application layers. Because of the importance of imaging members and for ease of the discussion of the flexible members 10, the description which follows is described particularly with an imaging member in mind. However, the application of the teachings of the present invention pertains to each of the wide variety of flexible members 10 which exist, and the scope of the description is intended to be broad enough to include all such flexible members.

The flexible member 10 may be a single layer or multiple layers. The layers of the flexible member 10 can comprise numerous suitable materials having the required mechanical properties. Examples of the types of layers and the properties thereof are described in U.S. Pat. Nos. 4,786,570, 4,937,117 and 5,021,309, the relevant portions of which are incorporated herein by reference thereto. Since it is becoming common to use a multiple layered imaging photoconductive member in the modern sophisticated machines, a multiple layered flexible member 10 of photoconductive imaging material is illustrated in FIG. 1. If the flexible member 10 is to be constructed into a negatively charged photoreceptor device, the flexible member 10 may comprise a charge generator layer sandwiched between a conductive surface and a charge transport layer. Alternatively, if the flexible member 10 is to be constructed into a positively charged photoreceptor device, the flexible member 10 may comprise a charge transport layer sandwiched between a conductive surface and a charge generator layer. Other layers, such as an electrical grounding strip layer, a blocking layer, and an adhesive layer, are typically employed. Optionally, an overcoat layer may be utilized to improve resistance to abrasions.

The illustrative flexible member 10 of FIG. 1, including each marginal end region 12 and 14, can be utilized as an imaging member and has layers extending top to bottom, of a 24.0 micron thick small molecule charge transport layer, hereinafter referred to as SMTL 16, a 2 micron thick binder generator layer, hereinafter referred to as BGL 18, a 0.05 micron (500 Angstrom) thick interface layer (an adhesive layer), hereinafter referred to as IFL 20, a 0.04 micron (400 Angstrom) thick silane layer (a blocking layer), hereinafter referred to as silane 22, a 0.02 micron (200 Angstrom) thick titanium layer (a conductive ground layer), hereinafter referred to as Ti 24, a 76.2 micron (3 milli-inch) thick biaxially oriented polyethylene terephthalate layer (a supporting thermoplastic film forming polymeric substrate layer), hereinafter referred to as PET 26, and a 14.0 micron thick anti-curl back coating layer, hereinafter referred to as ACBC 28. It should be understood that the illustrative thicknesses of the layers are for example only and that a wide range of thicknesses can be used for each of the layers.

Figure 1A:
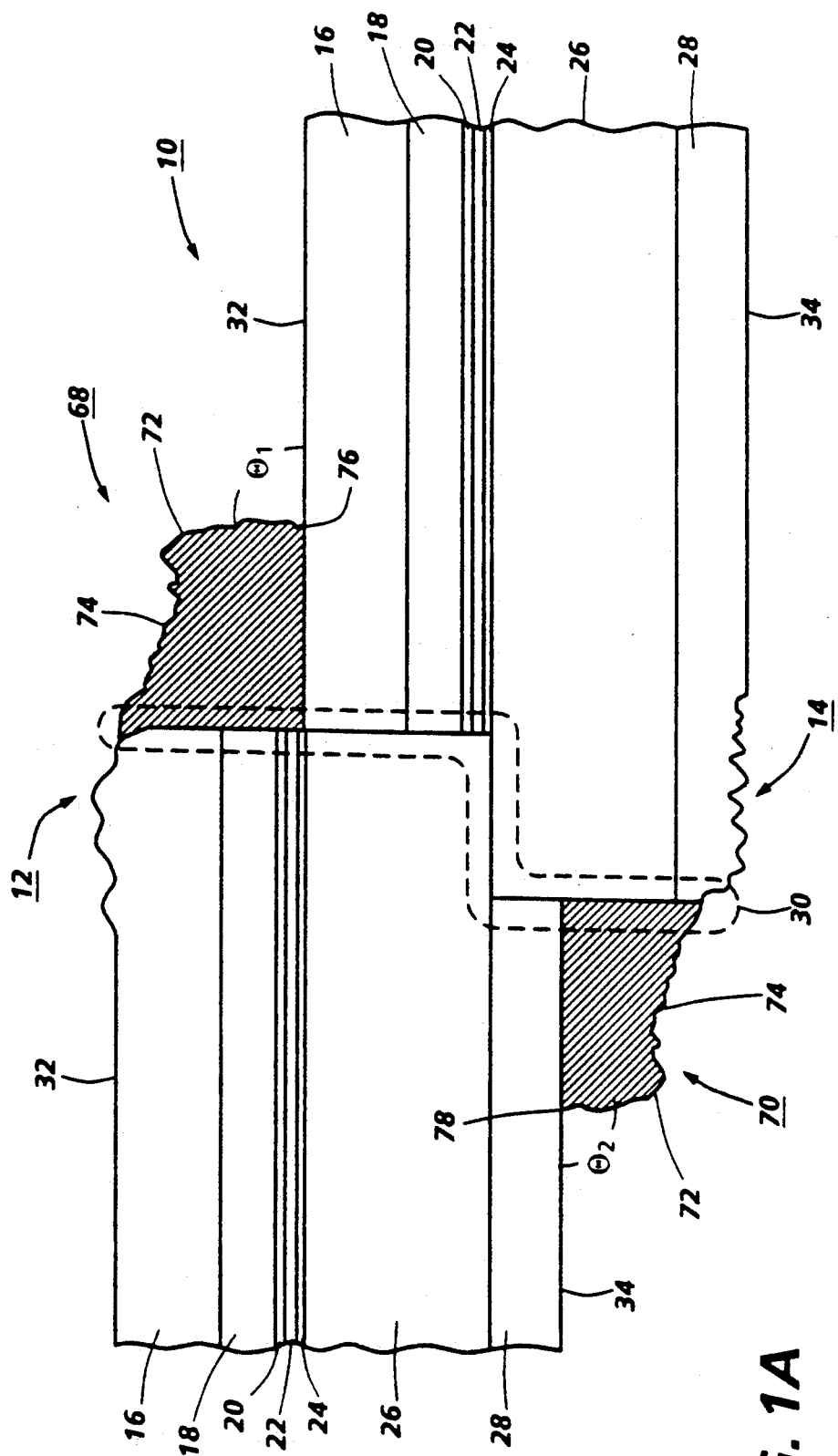
FIG. 1A is a cross-sectional view of a multiple layered seamed flexible member in the form of a continuous imaging belt.

The marginal end regions 12 and 14 can be joined by any suitable means including, gluing, taping, stapling, pressure and heat fusing to form a continuous member, such as a belt, sleeve, or cylinder. Preferably, both heat and pressure are used to bond the marginal end regions 12 and 14 into a seam 30 in the overlap region as illustrated in FIG. 1A. The flexible member 10 is thus transformed from a sheet of photoconductive imaging material as illustrated in FIG. 1 to a continuous photoconductive imaging belt as illustrated in FIG. 1A. The flexible member 10 has a first exterior surface or side, e.g., top surface 32, and a second exterior surface, e.g., bottom surface 34, opposed therefrom. The seam 30 joins the flexible member 10 such that the bottom surface 34 (and generally including at least one layer thereabove) at and/or near the first marginal end region 12 is integral with the top surface 32 (and generally at least one layer therebelow) at and/or near the second marginal end region 14.

One suitable heat and pressure joining means includes ultrasonic welding, in which, the sheet of photoconductive imaging material can form a photoreceptor belt. The belt can be fabricated by lap-joined ultrasonic welding of two or more layers, typically from the group comprising the SMTL 16, BGL 18, IFL 20, silane 22, Ti 24, PET 26 and ACBC 28. In the ultrasonic seam welding process, ultrasonic energy, applied to the overlap region, is used to melt the applicable layer of the SMTL 16, BGL 18, IFL 20, silane 22, Ti 24, PET 26 and/or ACBC 28. Direct PET 26-PET 26 fusing is required to achieve the optimum seam strength.

Figure 2:
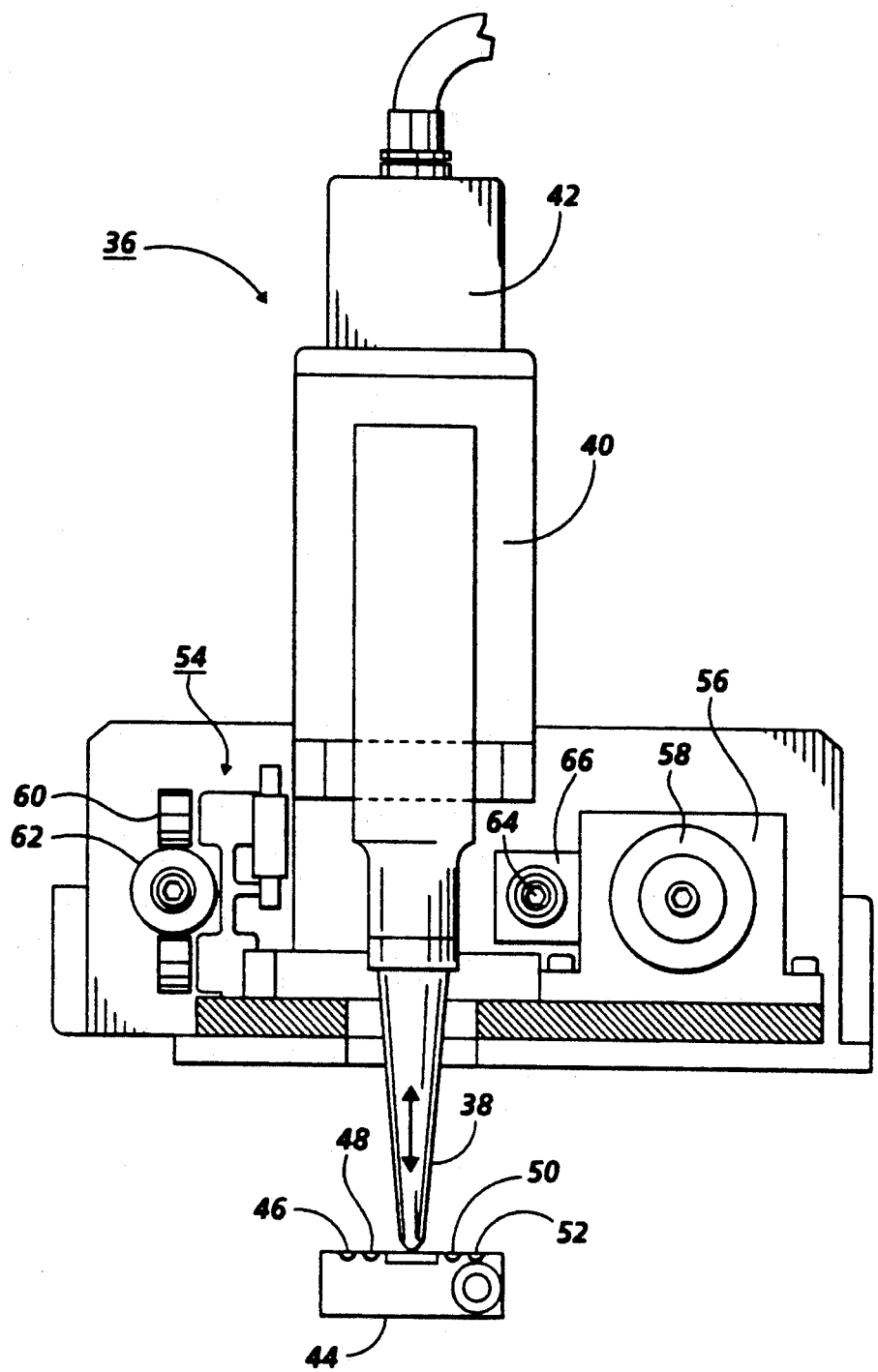
FIG. 2 is a schematic elevational view of an ultrasonic welding apparatus.

An ultrasonic welding apparatus 36, arranged in accordance with prior practice, is shown in FIG. 2. The apparatus 36 comprises an ultrasonic horn 38 which is caused to oscillate along its longitudinal axis by a transducer assembly 40 affixed to the top thereof. A solenoid 42 is mounted above the transducer assembly 40 to extend or retract the ultrasonic horn 38 and the transducer assembly 40 in the vertical direction. The seam 30, (not shown in FIG. 2) formed by the overlapping segment marginal end regions 12 and 14 of the flexible member 10, is supported by the upper surface of anvil 44 and held in place below the path of the ultrasonic horn 38 by suction from parallel rows of grooves 46, 48, 50 and 52. The anvil 44 preferably includes or is connected to a compressed air source for facilitating the adjustment of the suction pressure. The ultrasonic horn 38 and the transducer assembly 40 are supported by the lower end of a vertically reciprocating shaft (not shown) extending from the lower end of the solenoid 42 mounted to the upper hinged half of a substantially horizontally reciprocating carriage 54. One side of the lower hinged half of the carriage 54 is suspended from pairs of pillow blocks 56 which, in turn, slide on a horizontal bar 58. The other side of carriage 54 is suspended from pairs of cam followers 60 that roll on the outer surface of a horizontal bar 62. A rotatable lead screw 64 drives the horizontally reciprocating carriage 54 through a ball screw 66 secured to the carriage 54. The horizontal bars 58 and 62, as well as the lead screw 64, are secured at each end by a frame assembly (not shown). The lead screw 64 is rotated by a belt driven by an electric motor (not shown) which is also supported by the frame assembly.

An alignment pin (not shown) is mounted to the frame assembly. The alignment pin is adapted to mate with an alignment pin receiving hole at the free end of the anvil 44 when the anvil 44 is indexed into the position for welding of the seam 30. An adjustable set screw (not shown) is positioned to extend upwardly from the lower hinged half of the carriage 54 to assist in maintaining a predetermined spacing between the bottom of the ultrasonic horn 38 and the top of the anvil 44. The adjustable screw is also utilized to ensure a uniform pressure on the seam 30. The end of the adjustable set screw rests against the bottom of the upper hinged half of the carriage 54. The upper and lower hinged halves of the carriage 54 are joined by a hinge (not shown). The hinge allows the upper hinged half of the carriage 54 and the ultrasonic horn 38 and the transducer assembly 40 to pivot along the hinge during welding to compensate in a substantially vertical direction for any irregularities encountered along the seam 30 during welding. Preferably, an air bellows (not shown) is positioned between the upper hinged half and the lower hinged half of the carriage 54 to adjust the pressure of the bottom of the ultrasonic horn 38 against the seam 30, e.g., to function as a counter-balance.

When the overlap region, formed by the marginal end regions 12 and 14 of the flexible member 10, is positioned on the anvil 44 below the ultrasonic horn 38 at a belt welding station, the solenoid 42 is inactivated to extend the transducer 40 toward the anvil 44 from a retracted position (in which the solenoid 42 is activated). The transducer 40 is activated by the electric motor to drive the lead screw 64 which, in turn, moves the horizontally reciprocating carriage 54 over the seam 30 supported by the anvil 44. A second solenoid (not shown) is activated to drive the alignment pin into the alignment pin receiving hole located at the free end of the anvil 44.

Figure 3:
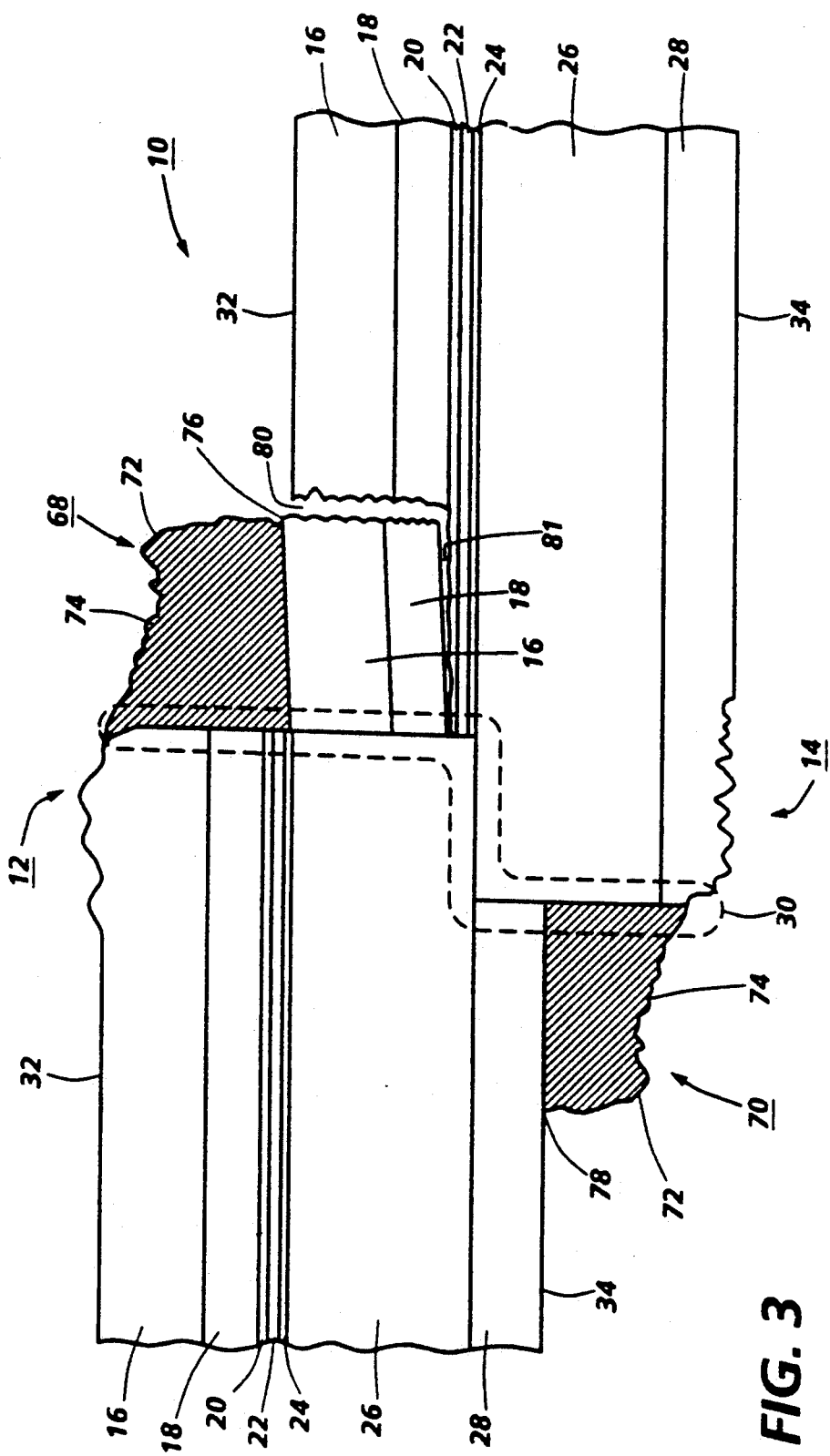
FIG. 3 is a cross-sectional view of a multiple layered seamed flexible member having tear initiation and seam delamination.

Lowering of the transducer 40 by inactivation of the solenoid 42 brings the ultrasonic horn 38 into compressive engagement with an appropriate overlap region, i.e., 0.047 inches of the flexible member 10. The welding surface of the ultrasonic horn 38 may be of any suitable shape, such as flat or curved cross-sectional shapes. The high vibration frequency of the ultrasonic horn 38 along its vertical axis causes the temperature of at least the contiguous overlapping surfaces of the flexible member 10 to increase until at least one layer (e.g., SMTL 16) of the flexible member 10 flows, resulting in the formation of a welded seam 30. Welding of the contiguous overlapping surfaces of the flexible member 10 can best be accomplished if the flexible member 10 comprises layers which flow as a result of the applied energy of ultrasonic oscillations (e.g., SMTL 16 and ACBC 28). For optimal seam strength, it is preferably that the layers of the flexible member 10 at the overlap region be brought to melting by the applied ultrasonic energy. In this manner, direct PET 26/PET 26 fusing can be achieved to form the welded seam 30 as illustrated in FIG. 1A and 3.

The flexible member 10 may be of any suitable thickness which will allow adequate heating of the contiguous overlapping surfaces of the marginal end regions 12 and 14 to permit sufficient heat energy to be applied at the contiguous overlapping surfaces to cause joining. Any suitable heating technique may be used to provide the heat necessary at the contiguous overlapping surfaces to melt the thermoplastic material and cause it to weld the overlap region of the flexible member 10. Thus, a suitable technique transforms the form of the flexible member 10 from a sheet of photoconductive imaging material into a photoconductive imaging belt.

If desired, the horn 38 may comprise highly thermoconductive material, such as aluminum, to ensure the achievement of higher temperatures at the interface between the overlapping marginal end regions 12 and 14 of the flexible member 10 and to minimize the thermal distortion of the exposed surfaces thereof. When ultrasonic welding is utilized at the contiguous overlapping region, the flexible member 10 is positioned between the anvil 44 and the ultrasonic horn 38. The rapid impact of the first marginal end region 12 against the second marginal end region 14 of the flexible member 10 causes the generation of heat. A horn vibration frequency from a range of about 16,000 KHz or higher may be utilized to cause the flexible member 10 to soften and melt. A typical horn suitable for joining the flexible member 10 utilizes a sonic generator of about 400-800 watt capacity, an operational frequency of about twenty KHz, and a flat input horn welding surface about twelve millimeters long and about 0.4 to 1.0 millimeters wide. A typical motion amplitude for this horn is about seventy-six micrometers. The combined weight of about two and a half kilograms for the ultrasonic horn 38, the transducer assembly 40 and the solenoid 42, and the upper hinged half of the carriage 54 is sufficient to bring the horn 38 into forced contact with the overlap region. However, an air bellows, a spring bias, weights, counterweights, or other suitable means may be utilized to increase or decrease the contact force. Since heat is generated very rapidly at the interface of the device, sufficient heat to cause the layers of the flexible member 10 to melt can occur typically in about 1.2 seconds as the horn 38 traverses along the overlap region.

As the horn 38 is lowered to the overlap region of the flexible member 10, electrical power is supplied to the transducer 40 and the electric motor (not shown) is activated to drive the lead screw 64 which, in turn, moves the horizontally reciprocating carriage 54 and the ultrasonic horn 38 along the overlap region of the flexible member 10. After the carriage 54 completes its traversal of the overlap region, the solenoid 42 is activated to retract the transducer 40 away from anvil 44, the transducer 40 is inactivated, the second solenoid (not shown) is inactivated to remove the alignment pin (not shown) from the alignment pin receiving hole, and the electric motor (not shown) is reversed to return the horizontally reciprocating carriage 54 to its starting position.

Upon completion of the welding of the overlap region into a seam 30, the overlap region is transformed into an overlapping and abutting region as illustrated in FIGS. 1A and 3. Within the overlapping and abutting region, the portions of the flexible member 10, which once formed the marginal end regions 12 and 14, are joined by the seam 30 such that the once marginal end regions 12 and 14 are overlapping and abutting one another. The welded seam 30 contains upper and lower flashings or splashings 68 and 70 at each end thereof as illustrated in FIGS. 1A and 3. The splashings 68 and 70 are formed in the process of joining the marginal end regions 12 and 14 together. Molten material is necessarily ejected from either side of the overlap region to facilitate direct PET 26/PET 26 fusing and results in the formation of the splashings 68 and 70. The upper splashing 68 is formed and positioned above the overlapping marginal end region 14 abutting the top surface 32 and adjacent and abutting the overlapping marginal end region 12. The lower splashing 70 is formed and positioned below the overlapping marginal end region 12 abutting the bottom surface 34 and adjacent and abutting the overlapping marginal end region 14. The splashings 68 and 70 extend beyond the sides and the edges of the seam 30 in the overlap region of the welded flexible member 10. The extension of the splashings 68 and 70 beyond the sides and the edges of the seam 30 is undesirable for many machines, such as electrostatographic copiers, duplicators and copiers that require precise edge positioning of a flexible member 10 during machine operation. Generally, the extension of the splashings 68 and 70 at the edges of the flexible member 10 are removed by notching.

Another desirable method in which the flexible member 10 in the form of a sheet, as illustrated in FIG. 1, can be fabricated into a belt as illustrated in FIG. 3 is impulse welding. An impulse welding apparatus typically comprises a heating element, e.g., a ¼ inch wide nickel foil (0.005 inch thick), mounted on a conductive plate, e.g., a 1×1 inch stock of aluminum. The conductive plate is positioned on the lower end of an actuator. The actuator includes internal mechanical movable parts similar to that previously explained with respect to the transducer assembly 28 and the carriage 42 of the ultrasonic welding apparatus 24 and need not be further discussed. Electrical power is supplied to the actuator, and thereby to the heating element, via a suitable electrical connection from a variac. An impluse welding apparatus typically produces a weld force in the range of 50 to 375 pounds during a weld time of 0.25 to 2.25 seconds. A typical variac setting can range from a setting of 5 to 14 (approximately 85° C. to 1375° C.). The actuator can be activated to position the heating element in contact with the flexible member 10. The flexible member 10 is positioned on a support plate and held in a desired and fixed position by a suitable means, such as pairs of clamps. Alternatively, the flexible member 10 can be held by vacuum suction as previously discussed as with respect to ultrasonic welding. The heating element, upon placement in close proximity to or in contact with the seam of the flexible member 10, effectuates the fusing of the marginal end regions 12 and 14 together.

A typical splashing has a thickness of about 68 microns. Each of the splashings 68 and 70 have an uneven but generally rectangular shape including one side (free side) 72 (which forms a free end) extending inwardly from an exterior facing side 74 (extending generally parallel to either the top surface 32 or the bottom surface 34). The free side 72 of the splashing 68 forms an approximately perpendicular angle $\theta_1$ with the top surface 32 of the flexible member 10. Likewise, the free side 72 of the splashing 70 forms an approximately perpendicular angle $\theta_2$ with the bottom surface 34 of the flexible member 10. A meeting or junction point 76 exists at the junction of the free side 72 of the upper splashing 68 and the top surface 32 of the flexible member 10. Likewise, a meeting or junction point 78 exists at the junction of the free side 72 of the lower splashing 70 and the bottom surface 34 of the flexible member 10. Both junction points 76 and 78 provide focal points for the stress concentration and become the initial points of failure affecting the mechanical integrity of the flexible member 10.

During machine operation, the flexible member 10 may function in various arrangements. For example, the flexible member 10 may be wrapped about a sleeve or a rigid drum so as to function as a photoreceptor drum within an electrophotographic imaging apparatus. Alternatively, the flexible member 10 may be fabricated into a photoreceptor belt which cycles or bends over rollers, particularly small diameter rollers, of a belt module within an electrophotographic imaging apparatus. In the latter case, as a result of dynamic bending of the flexible member 10 during cycling, the rollers exert a force on the flexible member 10 which causes large stress to develop generally adjacent the seam 30 due to the excessive thickness thereof.

The stress concentrations that are induced by bending near the junction points 76 and 78 may reach values much larger than the average value of the stress over the entire length of the flexible member 10. The induced bending stress is inversely related to the diameter of a roller that the flexible member 10 bends over and directly related to the thickness of the seam 30 of the flexible member 10. When a structural member, such as the flexible member 10, contains a sudden increase in cross-sectional thickness at the overlap region, high localized stress occurs near the discontinuity, e.g., junction points 76 and 78.

When the flexible member 10 bends over the rollers of a belt module within an electrophotographic imaging apparatus, the bottom surface 34 of the flexible member 10, which is adapted to contact the exterior surface of the roller, is compressed. In contrast, the top surface 32 is stretched under tension. This is attributable to the fact that the top surface 32 and the bottom surface 34 move in a circular path about the circular roller. Since the top surface 32 is at greater radial distance from the center of the circular roller than the bottom surface 34, the top surface 32 has to travel a greater distance than the bottom surface 34 in the same time period. Therefore, the top surface 32 will have to be stretched under tension relative to a generally central portion of the flexible member 10 (the portion of the flexible member 10 generally extending along the center of gravity of the flexible member 10). Likewise, the bottom surface 34 will have to be compressed relative to the generally central portion of the flexible member 10 (the portion of the flexible member 10 generally extending along the center of gravity of the flexible member 10). Consequently, the bending stress at the junction point 76 will be tension stress, and the bending stress at the junction point 78 will be compression stress.

Compression stresses, such as at the junction point 78, rarely cause seam 30 failure. Tension stresses, such as at junction point 76, however, are much more problematic. The tension stress concentration at the junction point 76 in great likelihood will eventually result in tear initiation through the electrically active layers of the flexible member 10 as illustrated in FIG. 3. The illustrative tear 80 is adjacent the second marginal end region 14 of the flexible member 10. The generally vertically extending tear 80 initiated in the SMTL 16 and continued to propagate through the BGL 18. Inevitably, the tear 80 extended generally horizontally to develop seam delamination 81 which propagated through the relatively weak adhesion bond between the adjoining surfaces of the BGL 18 and the IFI 20. The formation of the local seam delamination 81 is typically known as seam puffing. The effect of the excess thickness of the splashing 68 and stress concentration at the junction point 76 is to cause the flexible member 10 to function during extended machine operation as if a material defect existed therein. The splashing 68, thus tends to promote the development of dynamic fatigue seam 30 failure and can lead to separation of the joined marginal end regions 12 and 14 severing the flexible member 10. Consequently, the service life of the flexible member 10 is shortened.

In addition to seam failure, the tear 80 acts as a depository site and collects toner, paper fibers, dirt, debris and other unwanted materials during electrophotographic imaging and cleaning processes of the flexible member 10. For example, during the cleaning process, a cleaning instrument, such as a cleaning blade, will repeatedly pass over the tear 80. As the site of the tear 80 becomes filled with debris, the cleaning instrument dislodges at least some portion of this highly concentrated level of debris from the tear 80. The amount of the debris, however, is beyond the instrument's capacity to remove. As a consequence thereof, the cleaning instrument will dislodge the highly concentrated level of debris but will not be able to remove the entire amount during the cleaning process. Instead, portions of the highly concentrated level of debris will be deposited onto the surface of the flexible member 10. In effect, the cleaning instrument will spread the debris across the surface of the flexible member 10 instead of removing the debris therefrom.

In addition to seam failure and debris spreading, if local seam delamination 81 occurs the portion of the flexible member 10 above the seam delamination 81, in effect, becomes a flap which can move upward. The upward movement of the flap presents an additional problem in the cleaning operation. The flap becomes an obstacle in the path of the cleaning instrument as the instrument travels across the surface of the flexible member 10. The cleaning instrument eventually strikes the flap when the flap extends upward. As the cleaning instrument strikes the flap, great force is exerted on the cleaning instrument which can lead to damaging thereof, e.g., excessive wear and tearing of the cleaning blade.

In addition to damaging the cleaning blade, the striking of the flap by the cleaning instrument causes unwanted motion in the flexible member 10. This unwanted motion adversely affects the copy/print quality produced by the flexible member 10. The copy/print quality is affected because imaging occurs on one part of the flexible member 10 simultaneously with cleaning of another part of the flexible member 10.

The motion problem with the flexible member 10 is not exclusively limited to a flexible member 10 undergoing seam delamination 81. The discontinuity in cross-sectional thickness of the flexible member 10 at junction points 76 and 78 also can create unwanted motion particularly when the flexible member 10 bends over small diameter rollers of a belt module or between two closely adjacent rollers.

The notable mechanical shortfall of the seam delamination 81 and the unwanted motion (caused by the cleaning instrument striking the flap of the seam delamination 81) in the flexible member 10 can be improved by changing the surface profile of the securing means to provide stress minimization on the flexible member 10. The securing means can be a portion of the flexible member 10, a securing material, such as one or more of the splashings 68 or 70, or both a portion of the flexible member 10 and one or more of the splashings 68 or 70. The securing means has one end thereof being integral with the sheet (forming the flexible member 10) adjacent one end of the sheet and the other end thereof being integral with the sheet adjacent the other end of the sheet. The securing means is effectively positioned to prevent seam tearing and delaminating and may be positioned within, adjacent or substantially adjacent the overlap region. Preferably, the surface profile of both first securing means and second securing means is improved. The first securing means is integral with one surface (and may include one or more adjacent layers) of the flexible member 10 and the second securing means is integral with another surface (and may include one or more adjacent layers) of the flexible member 10. For example, the first securing means can be defined as the upper splashing 68, or a portion of the flexible member 10, preferably that which extends generally from the top surface 32 generally adjacent or integral with the first marginal end region 12 to the top surface 32 generally adjacent or integral with the second marginal end region 14 (and may include one or more adjoining and/or adjacent layers), or both the preceding described flexible member 10 portion and the splashing 68. Likewise, the second securing means can be defined as the lower splashing 70, or a portion of the flexible member 10, preferably that which extends generally from the bottom surface 34 generally adjacent or integral with the first marginal end region 12 to the bottom surface 34 generally adjacent or integral with the second marginal end region 14 (and may include one or more adjoining and/or adjacent layers), or both the preceding described flexible member 10 portion and the splashing 70.

It should be understood that modification of the surface profile of the first securing means (upper splashing 68, a portion of the flexible member 10, or both the splashing 68 and a portion of the flexible member 10) provides the greatest benefit in providing stress minimization since the first securing means is under bending induced tension stress. This tension stress caused by the bending over a small diameter roller of a belt module, in the service environment of the flexible member 10 within an electrophotographic imaging apparatus, is approximately ten times greater than that when the flexible member 10 is in a flat configuration. This large tension stress eventually results in seam tearing and delaminating. Thus, the benefit of utilizing the first securing means in minimizing the stress tension caused by such bending should be readily appreciated.

Since the second securing means (lower splashing 70, a portion of the flexible member 10, or both the splashing 70 and a portion of the flexible member 10) is under compression bending stress when the flexible member 10 bends over a roller, the likelihood of (seam) tearing or delaminating therein is limited. Thus, the benefit in modifying the profile of the second securing means is not as great and is described only as an option for reducing additional stress beyond tension stress. However, the modification of the profile of the second securing means has the benefit of minimizing or eliminating the previously described motion problem of the flexible member 10.

The surface profile of the securing means can be improved (by including altering the shape thereof and reducing the thickness thereof) by a variety of well known surface treatment methods, such as chemical treatment and mechanical treatment which may involve further welding, abrasion, grinding or polishing. Preferably, the method of laser ablation is used to improve the securing means profile through altering the shape thereof and reducing the thickness thereof. Laser ablation refers to material being ejected by the sole interaction of a high intensity laser pulse with the material. Laser ablation is usually described in terms of a physical mechanism, such as vaporization, ionization, or exfoliation. Ablation is most often performed in a vacuum or air.

There are two kinds of laser ablation mechanisms: thermal and electronic (or non-thermal). If a thermal laser ablation process is used to change the securing means profile, an intense laser pulse will be utilized to very rapidly heat and melt the surface of the securing means to alter the shape thereof.

If an electronic laser ablation mechanism is used, there will be no reliance on heating to change the securing means profile. Two electronic laser ablation processes are widely known. In the first, laser photons would be used to directly excite and break the bonds of the securing means to alter the shape thereof. In the second, photo-excitation creates electronhole pairs. Once created, the potential energy of the electron-hole pairs may be coupled directly into kinetic energy of the atoms of the splashing 68 via a radiation-free process. The energized atoms are able to overcome the surface binding energy to alter the shape of the securing means.

Electronic laser ablation is particularly preferred because (1) little or no thermal damage is observed in the area surrounding the ablated region, (2) large ablation depths per laser pulse are produced, and (3) spatial patterning and the ablated depth can be controlled precisely.

Another method of improving the securing means profile is pulsed laser etching which has many of the same physical interaction mechanisms as laser ablation. Laser etching occurs in the following steps: 1) formation of reactive chemical species; 2) reaction of these species with the securing means to alter the shape thereof; and 3) removal of the excess waste from the surface of the flexible member 10.

Laser etching is a chemically assisted laser removal process that results from laser irradiation in conjunction with an external gas or liquid (or even a solid) that chemically reacts with the securing means. Laser etching, however, requires an active chemical medium to be in contact with the securing means because the laser induced chemical reactions serve as the driving force for material removal. The input energy required to initiate these reactions is relatively small. Generally, it is expected that laser ablation will be chosen over laser etching because there is no need for a chemical medium. It is expected, however, that etching will be chosen over ablation whenever it is desirable to minimize the thermal loading on the securing means. In addition, etching is also considered beneficial in preventing seam distortion affecting the dimensional integrity of the flexible member 10.

Figure 4:
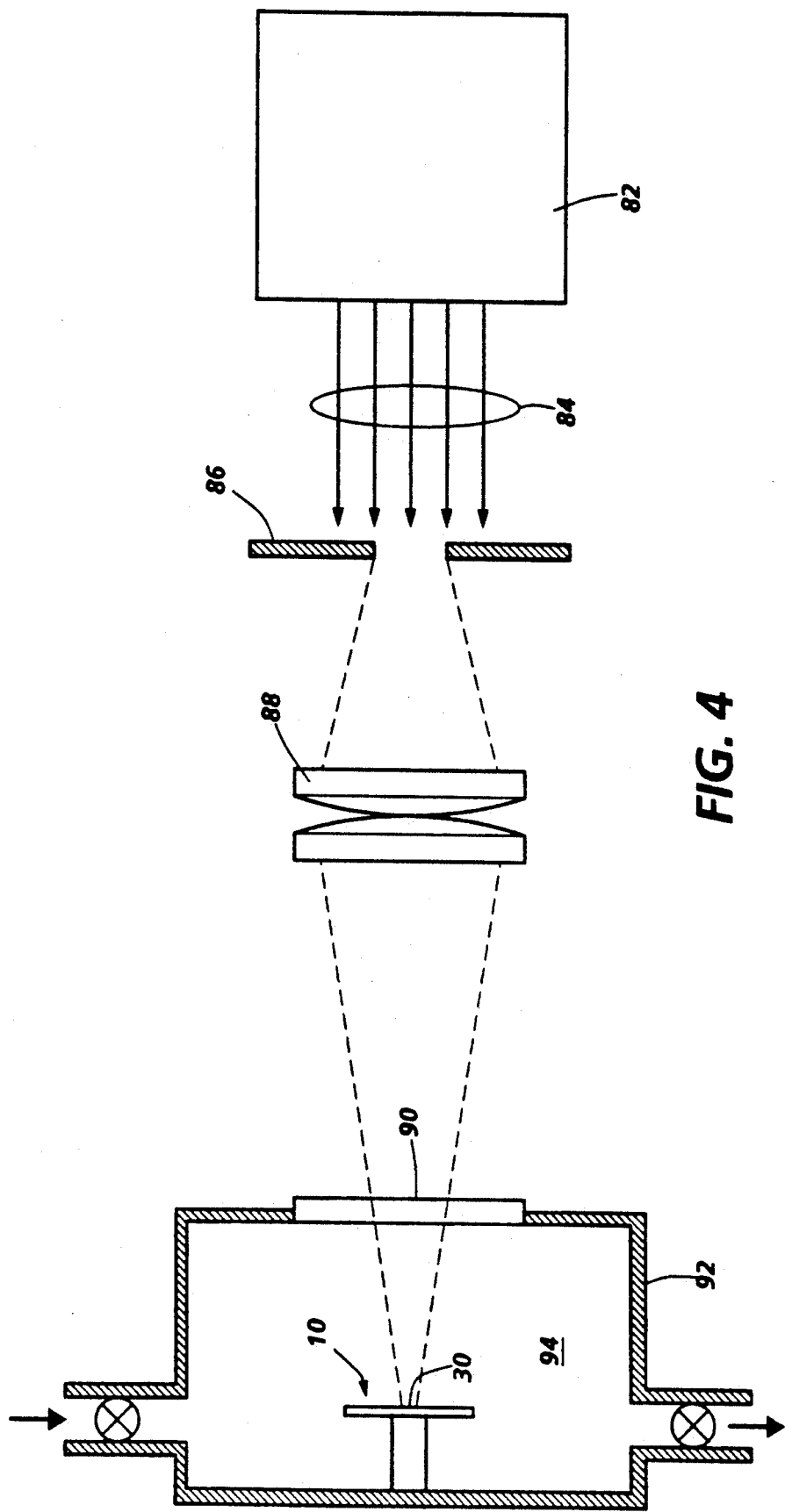
FIG. 4 is a schematic elevational view of an equipment system for performing laser ablation and etching.

An illustrative excimer laser 82 for use in either the ablation or etching process is shown in FIG. 4. The excimer laser 82 emits laser pulses 84 through an aperture or mask 86 into an imaging or focusing lens 88. The lens 88 focuses the laser pulses 84 through a window 90 (preferably formed of silica) of the cell 92 onto the flexible member 10 and against the securing means. The equipment setups for performing excimer laser ablation and etching are similar. Ablation is often performed in a vacuum 94, while laser assisted etching requires the presence of an etchant or chemical medium in the cell 92. When ablation is performed in air, a cell for containing a chemical medium is not required.

Another method of improving the securing means profile and thickness could use the previously described ultrasonic welding technique which originally formed the seam 30. The splashing 68 could be placed beneath the ultrasonic horn 38 to melt the splashing 68 until the desired alteration of the shape is achieved.

Another method of improving the securing means profile would be chemical treatment thereof. Such treatment would of course be affected by the material which forms the flexible member 10. For example, in flexible members having metallic layers, e.g., a metallic substrate layer, the securing means can be subjected to electrolysis, such as anodizing, in an oxidized electrolyte. Glacial acetic acid and phosphoric acid can be employed with the addition of acids having a strong oxidizing force, such as perchloric acid and chromic acid. Preferable examples of an electrolyte are sulphuric acid, oxalic acid and phosphoric acid because the film produced on the surface of the securing means is colorless when the above electrolytes are employed.

The securing means profile could also be improved by a variety of mechanical devices, such as an abrasive wheel or a smooth hot wheel having a heating element. A round wheel, mounted to any suitable support structure, could be electrically connected to and rotatably driven by a suitable motor. The support structure would preferably include means to adjust the height relative to the securing means including the utilization of a transducer assembly and solenoid as hereinbefore described with respect to the adjusting of the height of the ultrasonic horn 38 with respect to the securing means. If a hot wheel is to be used, a heating element is positioned within the wheel and is electrically connected to a suitable power source, such as a battery. The heating element appropriately heats the outer surface of the wheel as well as the securing means when the position of the wheel is adjusted for contact with the securing means. The increased temperature of the wheel is then used to adjust the securing means profile.

The range of temperatures by which the securing means is heated up to depends on the thermal and rheological properties, e.g., the glass transition temperature, of the photosensitive layers used in the flexible member 10 and are at least sufficiently high for adjusting the securing means profile. When the photosensitive layers have reached their respective glass transition temperatures, the photosensitive layers are in a high viscosity state. The high viscosity state of the photosensitive layers readily permits securing means removal through flow therein and shape altering by pressure thereagainst. Typically, the temperature of the wheel ranges from 60° C. to 220° C. if utilizing a heating element.

In addition to or alternative to the use of a heating element, the wheel may have an abrasive surface. The abrasive surface of the wheel, when adjusted for contact with securing means, is utilized to rub or wear against the securing means to alter the profile thereof. Preferably, the abrasive surface has a multiplicity of either striations, coarse grits or grainy points of abrasive contact each having a size approximately in the range of 5 to 10 microns to provide efficient polishing. If the shape of the securing means is altered by abrasive grinding, the temperature of the wheel is substantially lower then that during heating, i.e., a wheel temperature of 15° C. to 60° C. This is because abrasive grinding is best performed when the ground material is cold.

Another mechanical device which could be utilized to adjust the securing means profile would be a skid plate which could be positioned to contact the securing means. The skid plate could comprise a heating element and/or an abrasive surface which could function in the manner hereinbefore described with respect to the hot-/abrasive wheel.

Figure 5:
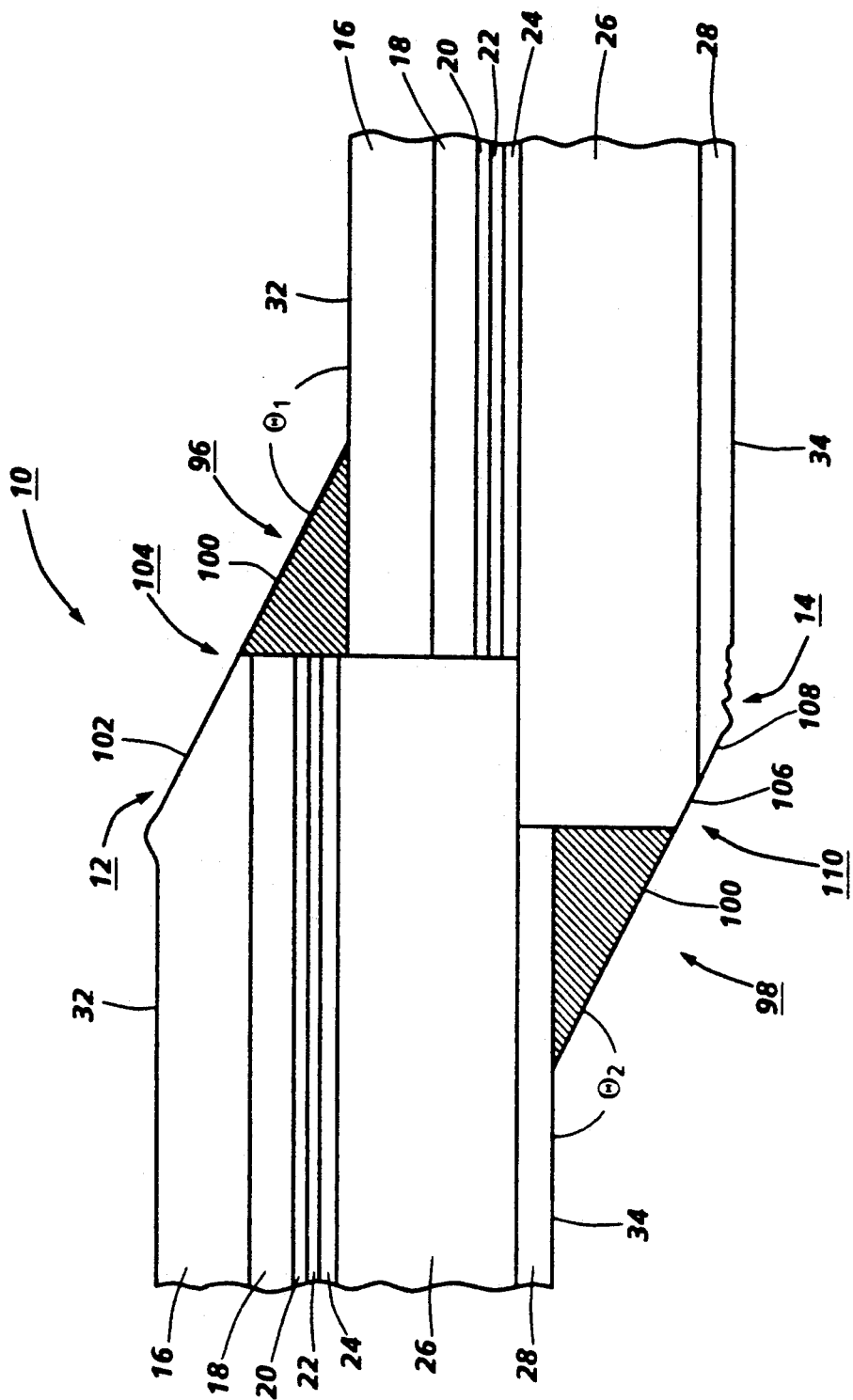
FIG. 5 is a schematic elevational of a shaped altered seamed flexible member in accordance with the present invention.

Using a suitable technique to alter the securing means profile, including the aforementioned techniques, the thickness of the splashings 68 and 70, as well as the thickness of a portion of the marginal end regions 12 and 14 of the flexible member 10 can be reduced. Also, the sudden change in the cross-sectional thickness of the flexible member 10 as illustrated in FIGS. 1A and 3 can be altered to a more gradual change in cross-section as illustrated in FIG. 5. The angle $\theta$, and more particularly the angles $\theta_1$ and $\theta_2$ formed, respectively, by the free side 72 of the splashing 68 and the top surface 32, and the free side 72 of the splashing 70 and the bottom surface 34, of the flexible member 10 are increased from their original and approximately perpendicular angles to angles greater than ninety degrees to reduce the discontinuity of the seam 30. The free side 72 and the outwardly facing side 74 of both the upper splashing 68 and the lower splashing 70 are altered so that the generally rectangular shapes of the upper and lower splashings 68 and 70 as illustrated in FIGS. 1A and 3 are changed to a generally desired shape including the triangular shape of the upper and lower splashings 96 and 98, respectively, as illustrated in FIG. 5. The sides 72 and 74 are altered until worn away so that a new side 100 is formed in place thereof.

For example, if a laser is used, pulses of laser photons are directed against sides 72 and 74 resulting in securing means removal until the thickness of the splashings 68 and 70 is reduced and the side 100 is formed therefrom. Likewise, chemical treating, hot wheel melting, abrasive wheel rubbing and other suitable techniques all result in the securing means removal to reduce the thickness of the splashings 68 and 70 and to change the rectangular shape of the splashings 68 and 70 into the triangular shape of the thinner splashings 96 and 98 formed therefrom.

Each side 100 forms a respective hypotenuse side of the triangularly shaped upper and lower splashings 96 and 98, respectively. In addition to altering the shape of the splashings 68 and 70, one or more of the layers of the flexible member 10, preferably the SMTL 16, BGL 18, PET 26 and ACBC 28, can be altered to also avoid a sudden change in the cross-sectional thickness of the flexible member 10. As illustrated in FIG. 5, the SMTL 16, integral with the marginal end region 12 has an angularly downwardly extending side 102 which adjoins the side 100 of the upper splashings 96 in a straight line such that the side 100 of the upper splashing 96 and the side 102 of the SMTL 16 are aligned in a linear fashion. The side 100 of the upper splashing 96 and the side 102 of the SMTL 16 together form an inclined substantially planar side 104 (extending transversely to the flexible member 10) of the first securing means. The planar side 104 has one end thereof being integral with one end of the flexible member 10 and the other end thereof being integral with the other end of the flexible member 10. The top surface 32, generally adjacent or integral with the second marginal end region 14, and the inclined planar side 104, in turn, form the angle $\theta_1$.

Likewise, the PET 26 and the ACBC 28 each have respective sides 106 and 108 integral with the marginal end region 14 having an angularly upwardly extending side which adjoins the side 100 of the lower splashing 98 in a straight line such that the side 100 of the lower splashing 98, the side 106 of the PET 26, and the side 108 of the ACBC 28 are aligned in a linear fashion. The side 100 of the lower splashing 98, the side 106 of the PET 26, and the side 108 of the ACBC 28 form an inclined substantially planar side 110 (extending transversely to the flexible member 10) of the second securing means. The planar side 110 has one end thereof being integral with one end of the flexible member 10 and the other end thereof being integral with the other end of the flexible member 10. The bottom surface 34, generally adjacent or integral with the first marginal end region, and the inclined planar side 110, in turn, form the angle $\theta_2$.

By increasing the angle $\theta$ ($\theta_1$ and/or $\theta_2$), from its original perpendicular angle of 90 degrees to a greater angle, the high concentrated stress at the sudden change in cross-sectional thickness of the flexible member 10 at the junction points 76 and 78 is avoided. The reduction in stress, in turn, reduces the rate of seam 30 failure and prolongs the mechanical service life of the flexible member 10.

It should be understood the surfaces or sides of the securing means are not limited to the sides or the surfaces of the layers illustrated in FIG. 5. For example, the side 102 is illustrated as being formed by the end of the SMTL 16 but it should be understood that the side 102 can be formed of the SMTL 16, BGL 18, IFL 20, Silane 22, Ti 24, and PET 26 or any combination thereof. The material of the side 102 is dependent on the width of the splashing 68 and the desired cross-sectional thickness reduction thereof. The same reasoning applies to sides 106 and 108 except excluding the SMTL 16 and including the ACBC 28.

In addition to altering the sudden change in cross-sectional thickness of the securing means at the junction points 76 and 78, the overall thickness of the securing means, including the splashings 68 and 70, can be decreased. Although the figures, are not drawn to scale, it should be understood that the thickness of the splashings 68 and 70 has been reduced by the selected shape altering technique in the formation of splashings 96 and 98 therefrom. Preferably, the maximum thickness (approximately 68 microns) of the splashings 68 and 70 has been reduced to less than 13.4 microns in the formation of the shape altered splashings 96 and 98.

Figure 6:
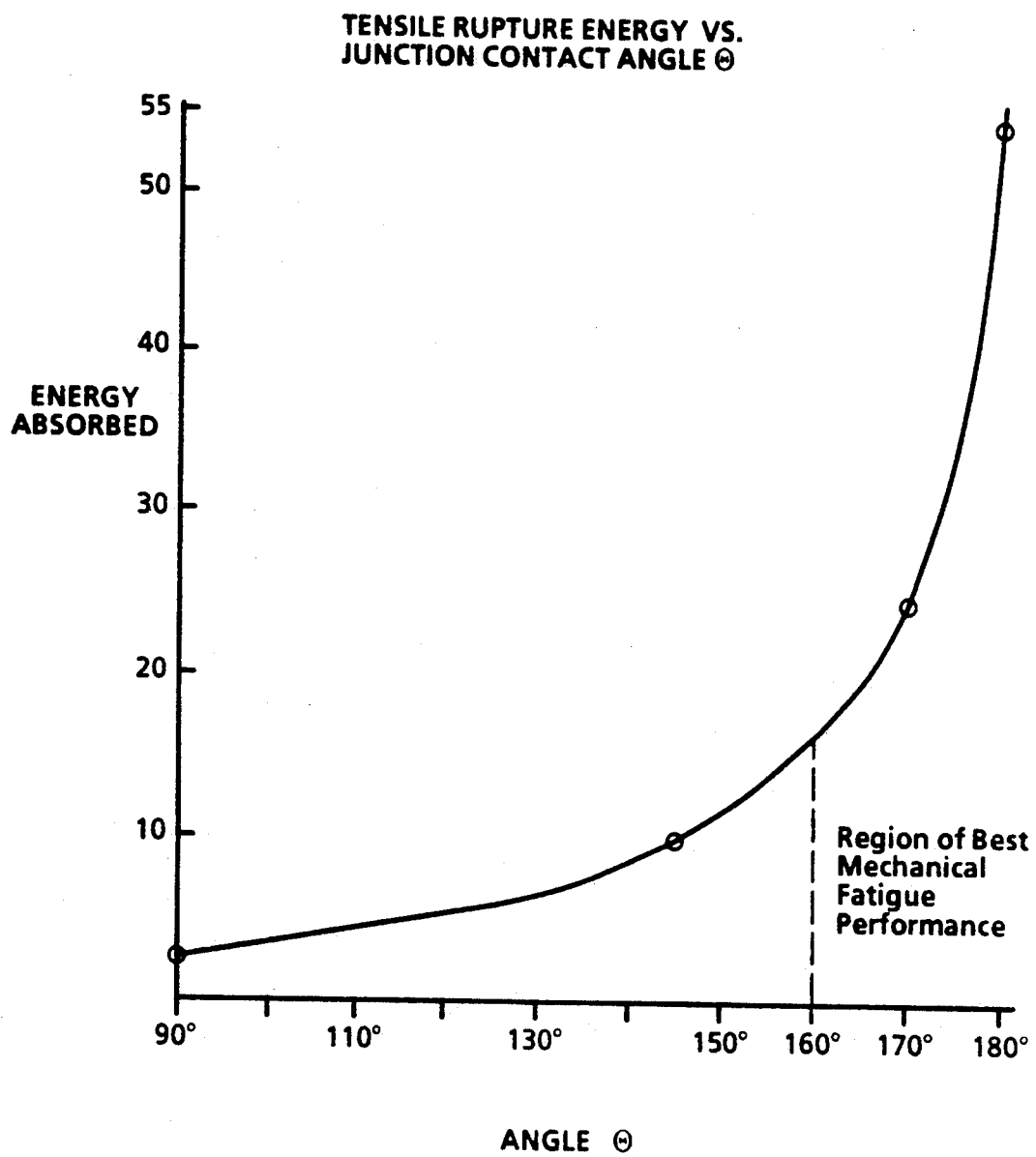
FIG. 6 is a plot of Tensile Rupture Energy vs. Junction Contact Angle $\theta$.

Various model samples of structures having different junction contact angles and splashing thickness were generated by the desired shape altering techniques to evaluate the dependence of seam failure on the junction contact angle and the splashing thickness. For simplicity, the results obtained for the effect of splashing thickness on seam failure are not presented, however, the fracture energy required to cause tensile tear initiation to occur at the stress concentration points (junction points 76 and 78) for each model structure as a function of the junction contact angle $\theta$ is tabulated in Table 1 below and correspondingly plotted in FIG. 6.

TABLE 1

Rupture Energy vs. Junction Contact Angle $\Theta$

| Junction Contact Angle | Break Tension Kg/cm | Energy Absorbed |
|---|---|---|
| 90° | 7.8 | 2.5 |
| 145° | 9.0 | 10.0 |
| 170° | 9.0 | 25.0 |
| 180° | 9.0 | 55.0 |

Note: Ratio of Seam Splashing Thickness to Flexible member thickness equals 0.61.

The experimental data suggests that a mechanically tough seam structure should consist of either a splashing thickness of less than 13.4 microns or a junction contact angle $\theta$ greater than 160 degrees to have a good dynamic seam fatigue resistance over a small diameter roller, such as a 19 millimeter roller. The experimental data also suggests that a flexible member 10 having a splashing thinner than 13.4 microns in combination with a junction contact angle $\theta$ greater than 160 degrees should provide the best mechanical fatigue performance. Using the previously described techniques for altering the shape of the securing means, junction contact angles $\theta$ of about 170 degrees can be obtained to provide even greater resistance to dynamic seam fatigue.

Experimental data results were also obtained for two sample active matrix photoreceptor belts having a 20 KHz ultrasonically welded seam. One of the sample belts was shape altered according to a method of the present invention and the other sample belt was not shape altered. Each of the photoreceptor belts were cycled in a XEROX ® 5046 electrophotographic machine and examined for seam failure. The dynamic cycling results (where the extent of seam failure characterized by the length of seam puffing in the belt is tabulated as a function of fatigue time) are tabulated in Table 2 below.

TABLE 2

Dynamic Fatigue Results

| Cycling Time (in hours) | 0 | 24 | 48 | 70 | 90 | 115 | 140 | 160 | 190 | 336 |
|---|---|---|---|---|---|---|---|---|---|---|
| Seam Puffing of the Unaltered Sample (In Millimeters) | 0 | 2 | 5 | 10 | 22 | 85 | 125 | 183 | 251 | — |
| Seam Puffing of the Altered Sample (in Millimeters) | 0 | 0 | 0 | 0 | 0 | 0 | 0 | 0 | 0 | 0 |

The results show that the seam of the unaltered sample started to fail and develop puffing (tear initiation and delamination) after 24 hours of cycling. This failure was seen to progressively propagate until seam puffing extending over a quarter of the width of the belt was observed at 115 hours. By 190 hours, the testing of the unaltered belt sample was ceased because the seam thereof had reached a point such that 75% of the splashing across the width of the belt was found to have cracked. In contrast, the shaped altered belt sample exhibited superb dynamic fatigue performance without any observable tear initiation within the seam during the 336 hour testing period.

In recapitulation, it is evident that the method for constructing a flexible imaging sheet produces a flexible imaging member without a sudden change in cross-sectional thickness as is typically founded in other seamed flexible imaging members adapted for use within an electrophotographic machine. The flexible imaging member of the present invention includes a shaped altered profile in which securing means has an inclined substantially planar surface formed integral with a sheet. The inclined planar surface extends in a direction transverse to the sheet with one end of the planar surface being integral with one end of the sheet and the other end of the planar surface being integral with the other end of the sheet. The inclined planar surface forms a junction contact angle with a surface of the sheet greater than ninety degrees, and preferably greater than one hundred and sixty degrees. The formed junction contact angle and inclined planar surface minimize the high localized stress of discontinuous cross-sectional thicknesses found in other seamed flexible imaging members, which discontinuous cross-sectional thicknesses, otherwise, tend to cause tear initiation within such flexible imaging members. Consequently, the shaped altered profile of the flexible imaging member of the present invention can be expected to extend the useful life of the flexible imaging member.

It is, therefore, apparent that there has been provided in accordance with the present invention, a flexible imaging member and a method for constructing a flexible imaging sheet that fully satisfies the aims and advantages hereinbefore set forth. While this invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A shape-altered seamed flexible imaging member, comprising:
   a sheet having a first marginal end region and a second marginal end region which overlap; and
   first securing means, defining a first beveled surface extending side edge to side edge in a direction transverse to said sheet with one end of said beveled surface being integral with said sheet adjacent one end of said sheet and the other end of said beveled surface being integral with said sheet adjacent the other end of said sheet, joining said first marginal end region and said second marginal end region to one another resulting in said seamed imaging member, wherein said beveled surface is effective for minimizing stress on said sheet.

2. A flexible imaging member according to claim 1, wherein said securing means comprises a splashing securing material.

3. A flexible imaging member according to claim 1, wherein said securing means comprises a portion of said sheet.

4. A flexible imaging member according to claim 1, including second securing means, defining a second beveled surface extending side edge to side edge in a direction transverse to said sheet with one end of said second beveled surface being integral with said sheet adjacent one end of said sheet and the other end of said second beveled surface being integral with said sheet adjacent the other end of said sheet, opposed from said first mentioned beveled surface, for joining said first marginal end region and said second marginal end region to one another, wherein said second beveled surface is effective for minimizing stress on said sheet.

5. A flexible imaging member according to claim 1, wherein said first mentioned securing means has a maximum thickness less than 13.4 microns.

6. A flexible imaging member according to claim 1, wherein said sheet comprises a layer selected from the group consisting of a photoconductive layer, an ionographic layer and a dielectric layer.

7. A flexible imaging member according to claim 1, wherein said sheet comprises a polymeric substrate layer.

8. The flexible imaging member according to claim 1, wherein the surface profile defines a junction contact angle ranging from greater than 90° to less than 180°.

9. The flexible imaging member according to claim 1, wherein the surface profile defines a junction contact angle ranging from about 145° to less than 180°.

10. The flexible imaging member according to claim 1, wherein the surface profile defines a junction contact angle ranging from about 160° to about 170°.

* * * * *

UNITED STATES PATENT AND TRADEMARK OFFICE
CERTIFICATE OF CORRECTION

PATENT NO. : 5,273,799
DATED : December 28, 1993
INVENTOR(S) : Robert C. U. Yu et al.

It is certified that error appears in the above--identified patent and that said Letters Patent is hereby corrected as shown below:

On the title page:

item: [22] Filed:", delete "Dec. 27, 1992" and insert in place thereof --Dec. 27, --1991--

Signed and Sealed this

Twenty-eighth Day of June, 1994

Attest:

BRUCE LEHMAN

Attesting Officer  Commissioner of Patents and Trademarks